UNITED STATES PATENT OFFICE.

HORACE KOECHLIN, OF LOWACH, BADEN, GERMANY.

MANUFACTURE OF COLORS OR DYE-STUFFS.

SPECIFICATION forming part of Letters Patent No. 253,721, dated February 14, 1882.

Application filed December 16, 1881. (No specimens.)

*To all whom it may concern:*

Be it known that I, HORACE KOECHLIN, a citizen of the Republic of France, now residing in Lowach, in the Grand Duchy of Baden, Germany, have invented a new and useful Improvement in the Production of Coloring-Matters for Dyeing and other Purposes, of which the following specification is a full description.

My invention consists in the production of violet coloring-matters by the action of the nitrosed derivatives of the tertiary amines, such as nitroso-dimethylaniline or nitroso-diethylaniline, or their salts, or their sulpho conjugate acids, or the chloroquinonimides on tannin, or on principles analogous to tannin, such as cachoutannic, catechuic, morintannic, quercitannic, quinotannic, caffeetannic acids, or their salts, or on the tannin of dividivi, or of sumac, or on gallic acid or its salts, or ethers.

To obtain one of these coloring-matters I operate in the following manner: I heat in a bath-pan a solution, either alcoholic, acetate, or aqueous, of hydrochlorate of nitroso-dimethylaniline and gallic acid. The product of the reaction is diluted with water slightly alkaline and precipitated by a weak acid—acetic acid, for instance—and filtered.

Other coloring-matters can be made by similar reactions. The products, as well as the method of producing the same, constitute part of the invention, which comprises therefore the preparation and the coloring-matters above mentioned.

I claim—

The improvement in the manufacture of coloring-matters, consisting in the production of violet coloring-matters by the action of nitroso derivatives of the tertiary amines on tannin, or equivalent reaction, substantially as described.

In witness whereof I have hereunto signed my name in the presence of two subscribing witnesses.

HORACE KOECHLIN.

Witnesses:
 R. LUSSY,
 EUG. ROESLER.